(No Model.)

M. E. GRISWOLD.
TOOL FOR REPAIRING PNEUMATIC TIRES.

No. 594,869. Patented Dec. 7, 1897.

Witnesses:
F. J. LeMoyne
Wm. M. LeMoyne

Inventor:
Marius E. Griswold
by
Louis V. LeMoyne
his Atty

UNITED STATES PATENT OFFICE.

MARIUS E. GRISWOLD, OF CHICAGO, ILLINOIS.

TOOL FOR REPAIRING PNEUMATIC TIRES.

SPECIFICATION forming part of Letters Patent No. 594,869, dated December 7, 1897.

Application filed December 17, 1894. Renewed May 13, 1897. Serial No. 636,409. (No model.)

*To all whom it may concern:*

Be it known that I, MARIUS E. GRISWOLD, a citizen of the United States, residing at Chicago, county of Cook, State of Illinois, have invented a new and useful Improvement in Tools for Repairing Pneumatic Tires, of which the following is a specification.

The object of my invention is to provide a tool, compact and simple, with which a rubber plug may be inserted into a puncture in the tire without enlarging the puncture and without removing the tire.

It consists of an outer expansible inserting tube which acts as a guide and expands the puncture, and an inner compressible carrier-plunger which is forced through it and carries a rubber plug into the tire and is then withdrawn, leaving the plug in the puncture.

It further consists of details hereinafter more fully described, and particularly pointed out in the claims.

Figure 1:
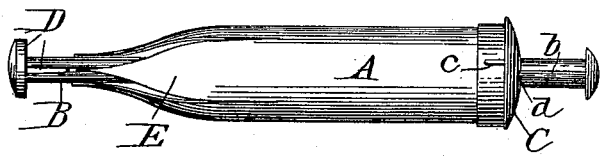
Figure 2:
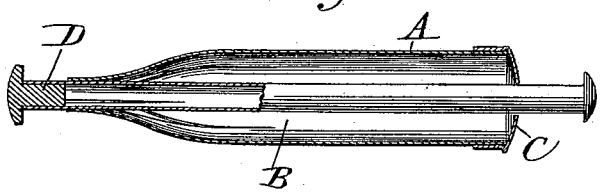
Figure 5:
Figure 3:
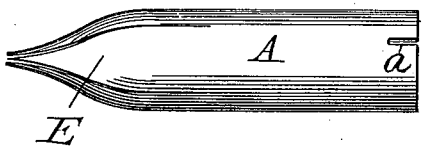
Figure 6:
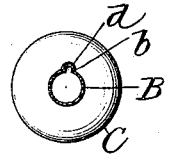
Figure 4:

Figure 1 is a side view of my invention, showing the plunger holding the plug and part way protruding. Fig. 2 is a longitudinal sectional view of Fig. 1. Fig. 3 is a detail view of the outer guide-tube. Fig. 4 is a detail view of the plunger and cap. Fig. 5 is a view of the rubber plug. Fig. 6 is an end view of Fig. 1, with the inner tube shown in section.

A represents the outer tube; B, the plunger; C, the cap, and D the plug. The tube A has a groove $a$ extending a short distance longitudinally from the end upon which the cap C fits. The cap has a tongue $c$, which fits into $a$ and prevents the cap from turning. The plunger B has a feather $b$ upon it which fits into the way $d$ in the cap C, thereby preventing the plunger from turning in the cap.

The tube A is tapered off into a funnel-shaped end E, which is cut into a number of sections longitudinally in order that it may be readily expanded as the plunger is forced into it. The plunger B is also split up longitudinally at the end F in a number of places and the sections slightly tapered off. The end E is tapered off to a fine point, so as to be readily inserted into a small hole. The end F is expanded in order that the plug D may be inserted the more easily.

The operation of my invention is as follows:

The rubber plug D is first inserted into the end of the plunger B after being suitably prepared with cement. The guide-tube A is then inserted in the puncture in the tire which is to be repaired and the plunger carrying the plug forced down through A, being partially compressed itself and compressing the rubber plug and partially expanding the tube A and the puncture in the tire. In this way the plug is forced into the inner cavity of the tire, where the head of the plug expands, completely covering the puncture on the inside. The tool may then be withdrawn, first drawing out the plunger and then the tube A, leaving the plug with its head within the tire and its stem in the puncture, making a tight and perfect patch upon the inside of the tire.

I prefer to set A and B relative to one another so as to break joints—that is, bringing the tongue of one opposite the slit in the other—in order that the plug may be more easily inserted. This I accomplish by setting the cap C upon A in the proper position, and B is prevented from turning relatively to A, as before described.

The size of the plunger B may be varied according to the size of the puncture to be mended and the plug to be inserted.

The plug is made of soft rubber, so that it may be easily compressed and inserted and will then expand.

What I claim, and desire to secure by Letters Patent, is—

1. The herein-described tool for repairing pneumatic tires, consisting of the combination of the outer tube A, having the expansible tapered end E and the inner plunger B, by which the plug is carried into the tire, having the compressible end F, with longitudinal tapered sections, all substantially as shown and described.

2. The herein-described tool for repairing pneumatic tires, consisting of the combination of the outer tube A, having the expansible tapered end E, the inner plunger B, by which the plug is carried into the tire, having the compressible end F, with longitudinal tapered sections, and the cap C forming a guide by which A and B are prevented from turning upon one another, and thereby caused to break joints, all substantially as shown and described.

3. The herein-described tool for repairing pneumatic tires, consisting of the combination of the outer tube A having the expansible, tapered end E, and the groove $a$, the plunger B by which the plug is inserted, having the feather $b$, and the cap C having the tongue $c$ and the way $d$, all substantially as shown and described.

MARIUS E. GRISWOLD.

Witnesses:
HENRY F. JOSLIN,
LOUIS V. LE MOYNE.